US008037451B2

(12) United States Patent
Best et al.

(10) Patent No.: US 8,037,451 B2
(45) Date of Patent: Oct. 11, 2011

(54) METHOD FOR TRACKING CODE REVISIONS WITH A CHECKSUM DATA VALUE BEING AUTOMATICALLY APPENDED TO SOURCE FILES

(75) Inventors: Steven F. Best, Georgetown, TX (US); Janice M. Girouard, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1408 days.

(21) Appl. No.: 11/538,184

(22) Filed: Oct. 3, 2006

(65) Prior Publication Data
US 2008/0127090 A1    May 29, 2008

(51) Int. Cl.
*G06F 9/45* (2006.01)

(52) U.S. Cl. ........................................................ 717/121

(58) Field of Classification Search .................... 717/121
See application file for complete search history.

(56) References Cited

U.S. PATENT DOCUMENTS

| 5,671,417 A * | 9/1997 | Miclette et al. ............... 717/130 |
| 2002/0129062 A1* | 9/2002 | Luparello ..................... 707/513 |
| 2002/0138748 A1* | 9/2002 | Hung .......................... 713/190 |

* cited by examiner

*Primary Examiner* — John Chavis
(74) *Attorney, Agent, or Firm* — Cantor Colburn LLP; Justin Dillon

(57) ABSTRACT

A method for tracking software code revisions with a checksum data value being automatically appended to source files. The method including assessing via a code management tool a source file containing source code. The method proceeds by appending a checksum data value via the code management tool to the source file. The method concludes by injecting the checksum data value into a binary module for display by a user.

4 Claims, 1 Drawing Sheet

METHOD FOR TRACKING CODE REVISIONS WITH A CHECKSUM DATA VALUE BEING AUTOMATICALLY APPENDED TO SOURCE FILES

TRADEMARKS

IBM® is a registered trademark of International Business Machines Corporation, Armonk, N.Y., U.S.A. Other names used herein may be registered trademarks, trademarks or product names of International Business Machines Corporation or other companies.

BACKGROUND OF THE INVENTION

1. Field of Invention

This invention relates in general to software applications, and more particularly to tracking software revisions.

2. Description of Background

Open source development using multiple licenses has made managing source code a serious challenge for corporations. As a result of the proliferation of projects based on open source code, corporations must support customers on unlimited, and somewhat unknown versions of software. Answering the question: "What driver do I need?" and comparing this to: "What driver am I running?" Needless to say, it has become a daunting and frustrating task to determine the necessary driver.

This issue was not present in proprietary operating systems, because vendors could control installation tools and use release numbers to track the version of the source code running on any given system. Since open source developers frequently do not update the release field (even if it is present) the current tools available for managing code levels do not work in this environment.

Specifically, existing code management tools such as a concurrent version system (CVS) tool fail to provide sufficient granularity when tagging files to assist with this problem. For example, today, CVS provides keyword substitution for elements such as:

$Revision: 1.5$
$Id:hello.c v 1.1 2001/06/01 03:21:13 jrandom Exp qsmith $
$R Csfile:hellow.c, v $ This source code informs a user that the revision number is 1.5 of the driver. However, in Linux, frequently there is a 1.5 version on a developer's A box, that's different from the 1.5 version of the code on developer's B box. The 1.5 shows you some general common origin, but does not uniquely identify the code. The current tools available for discovering what is running on an existing system are to obtain the output from a modprobe-v program.

Thus, there is a need for a source code management system to calculate the checksum of the source file itself and allow the user to tag the file for display by programs such as the modprobe.

SUMMARY OF THE INVENTION

The shortcomings of the prior art are overcome, and additional advantages are provided through the provision of a method for tracking software code revisions with a checksum data value being automatically appended to source files. The method includes assessing via a code management tool a source file containing source code. The method proceeds by appending a checksum data value via the code management tool to the source file. The method concludes with injecting the checksum data value into a binary module for display by a user.

Additional features and advantages are realized through the techniques of the present invention. Other embodiments and aspects of the invention are described in detail herein and are considered a part of the claimed invention. For a better understanding of the invention with advantages and features, refer to the description and to the drawing.

TECHNICAL EFFECTS

As a result of the summarized invention, technically we have achieved a solution for a method for tracking software code revisions with a checksum data value being automatically appended to source files.

BRIEF DESCRIPTION OF THE DRAWINGS

The subject regarded as the invention is particularly pointed out and distinctly claimed in the claims at the conclusion of the specification. The foregoing and other objects, features, and advantages of the invention are apparent from the following detailed description taken in conjunction with the accompanying drawing in which:

Figure 1:
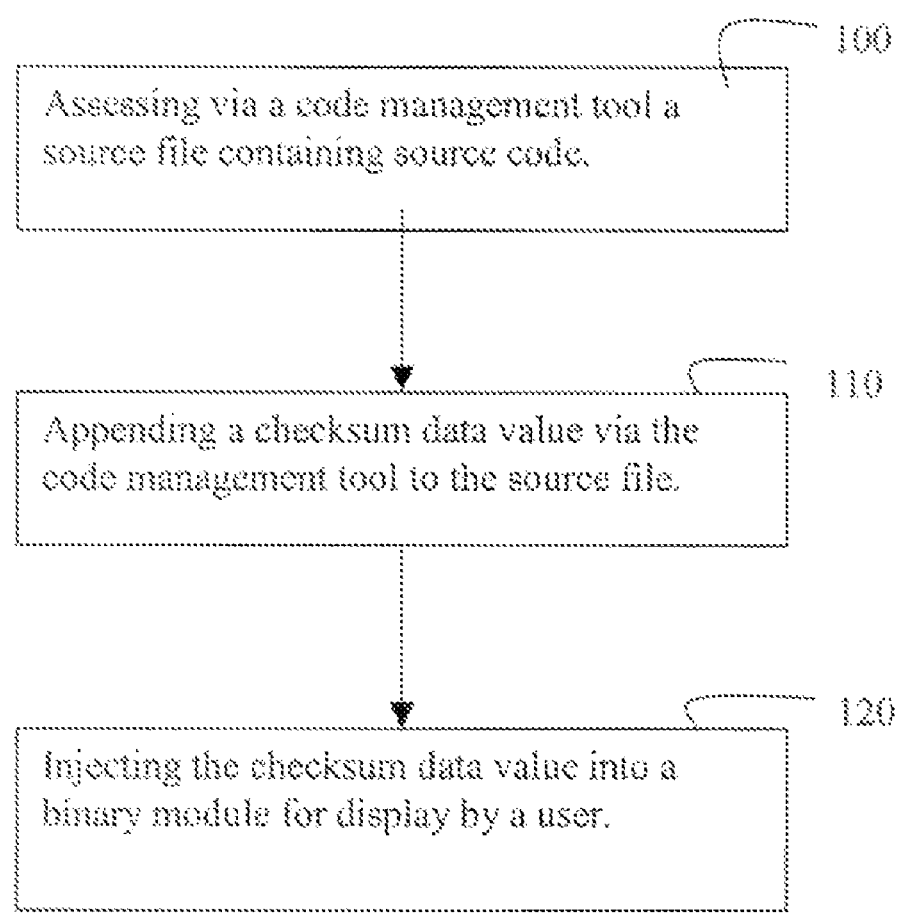
FIG. 1 illustrates one example of a method for tracking software code revisions with a checksum data value being automatically appended to source files.

The detailed description explains an exemplary embodiment of the invention, together with advantages and features, by way of example with reference to the drawing.

DETAILED DESCRIPTION OF THE INVENTION

Referring to FIG. 1, a method for tracking software code revisions with a checksum data value being automatically appended to source files, is shown.

The method begins with step 100, at which point a source file containing source code is assessed via a code management tool. At step 110, a checksum data value is appended via the code management tool to the source file.

Concluding at step 120, the checksum data value is injected into a binary module for display by a user.

The code management tool utilized is a concurrent version system (CVS) tool used for updating and maintaining source code involving open source code projects. The CVS tool identifies the number of times the source code has been revised.

The CVS tool supports a tag $DIRSUM command line tool. The $DIRSUM command line tool is utilized for containing the sum of the source code revision numbers located in the source file and all other files in any subdirectory of the source file.

A csum.h file is created to contain the $DIRSUM command line tool for at least one of, (i) each directory in the source file tree, and (ii) a particular directory chosen by the user.

The source code revision number data is saved for all programs in common utility routines. Furthermore, the saved data is provided during information systems in mobile and wireless environment (Ismod-v).

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A computer implemented method for tracking software code revisions comprising:

assessing via a concurrent version system (CVS) tool for updating and maintaining source code involving open source code projects, a source file containing source code, the CVS tool being operative to identify a number of times the source code has been revised, wherein the CVS tool supports a tag $DIRSUM command line tool, the $DIRSUM command line tool being utilized for containing the sum of the source code revision numbers located in the source file and all other files in any subdirectory of the source file;

appending a checksum data value via the CVS tool to the source file; and injecting the checksum data value into a binary module for display by a user.

2. The method of claim 1, further including creating a csum.h file to contain the $DIRSUM command line tool for at least one of, (i) each directory in the source file tree, and (ii) a particular directory chosen by the user.

3. The method of claim 2, wherein the source code revision number data is saved for a program in common utility routines.

4. The method of claim 3, wherein the saved data is provided during information systems in mobile and wireless environments.

* * * * *